United States Patent [19]

Mukai

[11] Patent Number: 5,430,126
[45] Date of Patent: Jul. 4, 1995

[54] PROCESS FOR PREPARATION OF BROMINATED STYRENE POLYMER PARTICLES

[75] Inventor: Akihiro Mukai, Mihara, Japan

[73] Assignee: Teijin Chemicals, Ltd., Tokyo, Japan

[21] Appl. No.: 128,103

[22] Filed: Sep. 29, 1993

[30] Foreign Application Priority Data

Sep. 29, 1992 [JP] Japan .................................. 4-259819

[51] Int. Cl.⁶ ................................................ C08F 6/22
[52] U.S. Cl. .................................. 528/493; 528/494; 528/497; 528/498
[58] Field of Search ................ 528/497, 498, 493, 494

[56] References Cited

U.S. PATENT DOCUMENTS 4,977,241 12/1990 Sugimori et al. .................... 528/498

FOREIGN PATENT DOCUMENTS 9119748 12/1991 WIPO .

OTHER PUBLICATIONS

Database WPI Derwent Publications, Ltd., London, GB; AN 90-243604[32] & JP-A-2 170 806 (Idemitsu Petrochem. KK.) 2 Jul. 1990.

*Primary Examiner*—Joseph L. Schofer
*Assistant Examiner*—Tom Weber
*Attorney, Agent, or Firm*—Sherman and Shalloway

[57] ABSTRACT

There are provided brominated styrene polymer particles whose hue is good and handling is easy and which contain fine particles and big particles only in a small amount. Such polymer particles are prepared by adding to a latex of a polymer obtained by emulsion polymerization of brominated styrene a specific amount of (A) an organic solvent sparingly soluble in water and capable of dissolving the polymer and a specific amount of (B) an organic solvent miscible with the organic solvent (A) in any ratio but sparingly soluble in water and incapable of dissolving the polymer and mixing the mixture, and then adding a coagulant and heat treating the mixture.

5 Claims, No Drawings

PROCESS FOR PREPARATION OF BROMINATED STYRENE POLYMER PARTICLES

This invention relates to a process for preparation of brominated styrene polymer particles. More detailedly, this invention relates to a process for preparation of brominated styrene polymer particles whose hue is good and handling is easy and which contain fine particles and big particles only in a small amount.

A brominated styrene polymer is a flame retardant widely used for polyamides, polyethylene terephthalate, polybutylene terephthalate, ABS resins, etc. However, brominated styrene polymers generally placed on the market have a color of light yellow to brown, and are thus mainly used for colored moldings alone. If this color could be eliminated, the extent of use would be expected, and thus is desired development of brominated styrene polymers whose hue is improved.

As for a process for preparing a brominated styrene polymer having a good hue and good physical properties, the present inventor has already developed a process of obtaining such a polymer by emulsion polymerizing brominated styrene in a system wherein an organic solvent capable of dissolving brominated styrene and sparingly soluble in water is added, and then removing this separated organic solvent from the latex.

For recovery of polymer particles from a polymer latex, a process has, usually, been carried out which comprises adding a coagulant in the latex to give a coagulation slurry, dehydrating it and drying it. However, when this process is applied for preparation of the brominated styrene polymer, the resultant powder is very small and contains a large amount of water and its drying requires much time and energy, and further the powder is liable to scatter and therefore there are problems in use as a flame retardant, for example, that the powder is liable to be sucked into the duct of the molding machine, and liable to remain in the hopper because of lack of the fluidity of the powder, and further there are problems, too, on the hygiene of the working environment, for example, that the working site is liable to get dirty by scattering of the powder and the workers absorb the powder.

The object of this invention lies in providing brominated styrene polymer particles whose hue is good and handling is easy and which contain fine particles and big particles only in a small amount.

The present inventor intensely investigated, for the purpose of attaining the above object, about processes for preparation of brominated styrene polymer particles, and as a result found that brominated styrene polymer particles having only a low content of fine particles and big particles and having a narrow particle size distribution are easily formed by adding a certain organic solvent to the polymer latex, adding thereto a coagulant, and then heat treating the mixture, and completed this invention.

Thus, according to this invention there is provided a process for preparation of brominated styrene polymer particles which comprises adding, to a latex of a polymer obtained by emulsion polymerization of brominated styrene such as tribromostyrene, dibromostyrene or a mixture thereof, (A) an organic solvent sparingly soluble in water and capable of dissolving the polymer and (B) an organic solvent miscible with the organic solvent (A) in any ratio but sparingly soluble in water and incapable of dissolving the polymer and mixing the mixture, and then adding a coagulant and heat treatment to form polymer particles, in which process the addition amounts of the organic solvent (A) and the organic solvent (B) based on the weight of the polymer are 2 to 100 wt. % and 5 to 150 wt. % respectively, and the weight ratio of the organic solvent (A) to the weight of the organic solvent (B) is 0.1 to 8.0.

The polymer latex used in this invention is a latex obtained by emulsion polymerization of a brominated styrene such as tribromostyrene, dibromostyrene or a mixture thereof. Particularly preferred polymer latex is a latex obtained by emulsion polymerizing brominated styrene in a system wherein an organic solvent is added capable of dissolving brominated styrene and sparingly soluble in water, or a latex obtained by removing the used organic solvent after the polymerization. Further, there can be used not only a latex of a homopolymer of a brominated styrene such as tribromostyrene or dibromostyrene and a latex of a copolymer of tribromostyrene with dibromostyrene, but a latex of a copolymer of brominated styrene with another monomer capable of radical polymerization therewith. As other monomers capable of radical polymerization, there can, for example, be mentioned aromatic vinyl compounds such as styrene, α-methylstyrene and dichlorostyrene; cyanidated vinyl compounds such as acrylonitrile and methacrylonitrile; alkyl (meth)acrylates such as methyl acrylate, ethyl acrylate and butyl acrylate; vinyl compounds such as acrylic acid, vinyl chloride, vinylidene chloride and vinyl acetate; conjugated diolefins and their substituted compounds such as butadiene, chloroprene and isoprene; etc.

"Sparingly soluble in water" referred to in the present specification means that the solubility in water is 5 wt. % or less, preferably 2 wt. % or less at 25° C., and in other words that 5 g or more, preferably 2 g or more of the organic solvent is not contained in 100 g of the aqueous solution at 25° C. Further, "capable of dissolving the polymer" means that 0.5 g or more of the polymer can dissolve in 100 ml of the organic solvent at 25° C.

The organic solvent (A) is an organic solvent sparingly soluble in water and capable of dissolving the brominated styrene polymer. Such organic solvent (A) varies depending on the type of the polymer, and as examples thereof there can, for example, be mentioned hydrocarbons such as petroleum ether, benzene, toluene, xylene, ethylbenzene and diethylbenzene; halogenated hydrocarbons such as methylene chloride, chloroform, carbon tetrachloride, dichloroethane and chlorobenzene; etc. However, organic solvents (A) are not limited thereto, and any solvents can be used solely or in a combination of two or more, so long as they are solvents satisfying the above conditions.

The organic solvent (B) is an organic solvent miscible with the organic solvent (A) in any ratio but sparingly soluble in water and incapable of dissolving the brominated styrene polymer. Such organic solvent (B) varies depending on the type of the polymer, and as examples thereof there can, for example, be mentioned aliphatic hydrocarbons such as hexane, heptane and octane; alicyclic hydrocarbons such as cyclopentane, cyclohexane and methylcyclohexane; non-polymerizable organic solvents such as diisobutyl ketone, methyl n-propyl ketone, n-propyl acetate and n-butyl acetate; etc. However, organic solvents (B) are not limited thereto, and any solvents can be used solely or in a combination of two or more, so long as they are solvents satisfying the above conditions.

These organic solvent (A) and organic solvent (B) can be added to the brominated styrene polymer latex by any method. There can, for example, be adopted a method comprising adding the organic solvent (B) after addition of the organic solvent (A) to the polymer latex, a method comprising adding the organic solvent (A) after addition of the organic solvent (B) to the polymer latex, a method comprising adding a mixed liquid of the organic solvent (A) with the organic solvent (B) to the polymer latex, etc. Further, when an organic solvent, particularly a solvent corresponding to the organic solvent (B) already exists in the polymer latex, it is possible to omit the addition of the organic solvent (B). Most preferable among them is the method comprising adding a mixed liquid of the organic solvent (A) with the organic solvent (B) to the polymer latex, since it is possible to make the particle size distribution most narrow.

In the process of this invention, it is necessary to use the organic solvent (A) in an amount of 2 to 100 wt. %, preferably 5 to 50 wt. % based on the weight of the brominated styrene polymer. It is necessary to use the organic solvent (B) in an amount of 5 to 150 wt.%, preferably 10 to 80 wt.% based on the weight of the brominated styrene polymer. And it is necessary that the ratio of the weight of the organic solvent (A) to the weight of the organic solvent (B) is 0.1 to 8.0, preferably 0.25 to 5.0.

When the amount of the organic solvent (A) does not reach 2 wt. %, fine powder is liable to be formed regardless of the amount of the organic solvent (B), and when the amount of the organic solvent (A) is larger than 100 wt. %, rebinding between particles occurs and big particles are liable to be formed regardless of the amount of the organic solvent (B). Further, even if there is a necessary amount of the organic solvent (A), when the amount of the organic solvent (B) does not reach 5 wt. %, big particles are liable to be formed, and when the amount of the organic solvent (B) is larger than 150 wt. %, fine powder is liable to be formed. Further even if both organic solvent (A) and organic solvent (B) exist in a necessary amount, when the ratio of the weight of the organic solvent (A) to the weight of the solvent (B) is under 0.1, particles are hard to form and fine powder is liable to occur, and when the weight ratio of the organic solvent (A) is above 8.0, a granulating action due to the recombination of the polymer particles becomes too strong and big particles are liable to occur.

As coagulants used in this invention, substances generally used as a coagulant can be used without any problem. As examples thereof, there can be mentioned metal salts such as aluminum sulfate, sodium sulfate, zinc sulfate, magnesium sulfate, magnesium chloride, sodium chloride, calcium chloride, sodium carbonate, sodium bicarbonate and potassium alum; inorganic acids such as nitric acid, hydrochloric acid and sulfuric acid; organic acids such as acetic acid and propionic acid; organic high molecular coagulants such as sodium polyacrylate, maleic acid copolymer, vinylpyridine copolymer salt and polyacrylamide; etc. These are used alone or in a combination of two or more according to the emulsifier to be used. Particularly preferred are salts of polyvalent metals and inorganic acids. The use amount of the coagulant is not particularly limited, but is usually about 0.05 to 25 wt. %, preferably 0.2 to 10 wt. % based on the weight of the brominated styrene polymer.

Such a coagulant is added to a brominated styrene polymer latex containing prescribed amounts of the organic solvent (A) and the organic solvent (B). By this, there can be obtained brominated styrene polymer particles containing only a small amount of fine powder and big particles and having the narrowest particles size distribution, and further it is possible to make the use amount of the organic solvent smallest. To the contrary, for example when the coagulant and the organic solvents are simultaneously added to the polymer latex, or when the coagulant is added to the polymer latex and then the organic solvents are added, polymer particles containing considerable amounts of fine powder and big particles and having a wide particle size distribution can only be obtained, and further the use amounts of the organic solvents increase, too. When the coagulant is added to a polymer latex wherein the organic solvents exist, it is desirable to stir the latex at a velocity adjusted so that the organic solvents uniformly disperse in the latex. Thereby, the formation of big particles is inhibited and therefore it is possible to make the particle size distribution narrow.

Further, after the granulation through coagulation by addition of the coagulant, the resultant coagula containing the polymer particles is heated to bind the coagula into appropriate sizes. The mixture is further successively heated to distil out the organic solvents, and then dehydrated and dried to obtain particles having appropriate sizes. The above heating is carried out, usually, under ordinary pressure, at a temperature equal to or higher than the boiling point or azeotropic point of the organic solvents. At the heat treatment, it is preferable to adjust the stirring velocity so as to inhibit excessive re-binding between particles. By this operation, it is possible to make the particle size distribution of the polymer particles narrower, and since the amount of the solvents contained in the particles decrease, it is possible to lower energy costs for drying.

According to the process of this invention, polymer particles can be obtained having extremely low contents of fine powders having a particle size of 37 μm or less and big particles having a particle size of 2 mm or more, having a narrow particle size distribution and being excellent in powder characteristics.

This invention is further described below by examples, but not limited to these examples. % and part in the examples represent wt. % and weight part, respectively.

EXAMPLE 1

100 parts of tribromostyrene, 5 parts of sodium stearate, 395 parts of deionized water and 34 parts of heptane were put in a flask equipped with a stirrer, a reflux condenser, a thermometer and a dropping funnel, the inside of the system was deaerated by replacement with nitrogen, and then the mixture was warmed to 60° C. After confirmation of the emulsion state, a solution obtained by dissolving 0.5 part of potassium persulfate in 5 parts of deionized water was put in the flask to initiate polymerization. After 3 hours reaction, the heptane phase was separated to obtain 500 parts of a tribromostyrene polymer latex having a solid content of 20%.

100 parts of the polymer latex was put in a glass vessel equipped with a stirring apparatus and a cooling apparatus, and to this was added a mixture obtained by mixing well 3.6 parts (corresponding to 18% based on the polymer) of toluene as an organic solvent (A) and 4.8 parts (corresponding to 24% based on the polymer) of heptane as an organic solvent (B). The contents of the vessel were sufficiently stirred so that the organic solvents could uniformly be dispersed, and 0.5 part of 2N-HCl was added as a coagulant to form polymer particles. The slurry containing the polymer particles was heated to 80° to 95° C. to remove toluene and heptane, dehydrated and dried to obtain tribromostyrene polymer particles. The particle size distribution of the resultant polymer particles is shown in Table 1. As apparent from Table 1, polymer particles were obtained free of fine powder and big particles and having a narrow particle size distribution.

EXAMPLE 2

The procedure of Example 1 was repeated except that the use amount of heptane was changed to 3.8 parts (corresponding to 19% based on the polymer). The results are shown in Table 1. As apparent from Table 1, polymer particles were obtained free of fine powder, containing an extremely small amount of big particles and having a narrow particle size distribution.

EXAMPLE 3

The procedure of Example 1 was repeated except that the use amount of toluene was changed to 4.4 parts (corresponding to 22% based on the polymer) and 7.4 parts (corresponding to 37% based on the polymer) of hexane was used in place of heptane. The results are shown in Table 1. As apparent from Table 1, polymer particles were obtained free of fine powder, and big particles and having a narrow particle size distribution.

Comparative Example 1

The coagulant was first added to a polymer latex obtained in the same manner as in Example 1 to prepare a slurry, and the same amounts of heptane and toluene as in Example 1 were added to form polymer particles. The results are shown in Table 1. As apparent from Table 1, only polymer particles having a wide particle size distribution were obtained.

Comparative Example 2

The procedure of Example 1 was repeated except for no use of heptane. The results are shown in Table 1. As apparent from Table 1, only polymer particles containing an extremely large amount of big particles were obtained.

Comparative Example 3

The procedure of Example 1 was repeated except that toluene was not used and the use amount of heptane was made to be 14.4 parts (corresponding to 72% based on the polymer). The results are shown in Table 1. As apparent from Table 1, only polymer particles containing an extremely large amount of fine powder were obtained.

Comparative Example 4

The procedure of Example 1 was repeated except that the use amount of toluene was changed to 0.36 part (corresponding to 1.8% based on the polymer) and the use amount of heptane was changed to 14.4 parts (corresponding to 72% based on the polymer). The results are shown in Table 1. As apparent from Table 1, only polymer particles having a wide particles size distribution were obtained.

EXAMPLE 4

400 parts of a dibromostyrene polymer latex having a solid content of 25% was obtained in the same manner as in Example 1 except for use of 100 parts of dibromostyrene and 295 parts of deionized water, 100 parts of the polymer latex was put in the same glass vessel as in Example 1, to this was added a mixture obtained by mixing well 2.2 parts (corresponding to 8.8 wt. % based on the polymer) of toluene as an organic solvent (A) with 5.2 parts (corresponding to 21 wt. % based on the polymer) of heptane as an organic solvent (B). The contents of the vessel were adequately stirred so that the organic solvents could uniformly be dispersed, and 1.2 parts of an aqueous 20% $MgSO_4$ solution was then added as a coagulant to form polymer particles. The slurry containing the polymer particles was heated to 80° to 95° C. to remove toluene and hexane, dehydrated and dried to obtain dibromostyrene polymer particles. The particle size distribution of the resultant polymer is shown in Table 1. As apparent from Table 1, polymer particles were obtained free of fine powder and big particles and having a narrow particle size distribution.

EXAMPLE 5

The procedure of Example 4 was repeated except that the use amount of heptane was changed to 3.5 parts (corresponding to 14 wt. % based on the polymer). The results are shown in Table 1. As apparent from Table 1, polymer particles were obtained free of fine powder, containing an extremely small amount of big particles and having a narrow particle size distribution.

EXAMPLE 6

The procedure of Example 4 was repeated except that the use amount of toluene was changed to 2.8 parts (corresponding to 11% based on the polymer) and 9.3 parts (corresponding to 37% based on the polymer) of hexane was used in place of heptane. The results are shown in Table 1. As apparent from Table 1, polymer particles were obtained free of fine powder, containing an extremely small amount of big particles and having a narrow particle size distribution.

Comparative Example 5

The procedure of Example 4 was repeated except that toluene was not used and the use amount of heptane was changed to 18.5 parts (corresponding to 74% based on the polymer). The results are shown in Table 1. As apparent from Table 1, only polymer particles containing an extremely large amount of fine powder were obtained.

Comparative Example 6

The procedure of Example 4 was repeated except for no use of heptane. The results are shown in Table 1. As apparent from Table 1, only polymer particles containing an extremely large amount of big particles were obtained.

Comparative Example 7

The procedure of Example 4 was repeated except that the use amount of heptane was changed to 0.1 part (corresponding to 0.4% based on the polymer). The results are shown in Table 1. As apparent from Table 1, only polymer particles containing an extremely large amount of big particles were obtained.

solvent (A) to the weight of the organic solvent (B) is 0.1 to 8.0.

TABLE 1

| | Organic Solvent (A) | | Organic Solvent (B) | | | Particle size distribution | | | | |
|---|---|---|---|---|---|---|---|---|---|---|
| | Kind | Addition amount (%) | Kind | Addition amount (%) | (A)/(B) | 2 mm or above | 2 mm-710 μm | 710-149 μm | 149-37 μm | Under 37 μm |
| Example 1 | Toluene | 18 | Heptane | 24 | 0.75 | 0 | 12.9 | 84.9 | 2.2 | 0 |
| Example 2 | Toluene | 18 | Heptane | 19 | 0.95 | 0.3 | 21.0 | 77.3 | 1.4 | 0 |
| Example 3 | Toluene | 22 | Hexane | 37 | 0.59 | 0 | 14.8 | 82.3 | 2.9 | 0 |
| Comparative Example 1 | Toluene | 18 | Heptane | 24 | 0.75 | 2.4 | 29.0 | 38.1 | 26.1 | 4.4 |
| Comparative Example 2 | Toluene | 18 | — | — | — | 52.0 | 28.0 | 15.1 | 4.5 | 0.4 |
| Comparative Example 3 | — | — | Heptane | 72 | 0 | 5.1 | 20.6 | 36.5 | 23.9 | 14.3 |
| Comparative Example 4 | Toluene | 1.8 | Heptane | 72 | 0.025 | 4.8 | 16.5 | 45.7 | 24.7 | 8.3 |
| Example 4 | Toluene | 8.8 | Heptane | 21 | 0.41 | 0 | 8.9 | 88.3 | 2.8 | 0 |
| Example 5 | Toluene | 8.8 | Heptane | 14 | 0.62 | 0.4 | 3.7 | 83.6 | 2.3 | 0 |
| Example 6 | Toluene | 11 | Hexane | 37 | 0.30 | 0.2 | 1.5 | 86.3 | 2.0 | 0 |
| Comparative Example 5 | — | — | Heptane | 74 | 0 | 0 | 9.4 | 37.4 | 43.9 | 9.3 |
| Comparative Example 6 | Toluene | 8.8 | — | — | — | 60.3 | 22.2 | 13.9 | 3.2 | 0.3 |
| Comparative Example 7 | Toluene | 8.8 | Heptane | 0.4 | 22 | 41.6 | 35.0 | 17.3 | 5.3 | 0.8 |

As demonstrated by the above Examples, according to the process of this invention, polymer particles containing only small amounts of fine powder and big particles, having a narrow particle size distribution and excellent in powder characteristics can readily be obtained from a polymer latex obtained by emulsion polymerization of brominated styrene. Since by use of such brominated styrene polymer particles of this invention workability and work environment can be improved when the brominated styrene polymer is used as a flame retardant, those polymer particles have an extremely large industrial value and are extremely useful in industry.

I claim:

1. A process for preparation of brominated styrene polymer particles which comprises adding to a latex of a brominated styrene polymer, obtained by emulsion polymerization, (A) an organic solvent sparingly soluble in water and capable of dissolving the polymer and (B) an organic solvent miscible with the organic solvent (A) in any ratio but sparingly soluble in water and which dissolves at least 0.5 g of said polymer per 100 ml of said solvent at 25° C., and mixing the resulting mixture, and then adding a coagulant to form polymer particles, wherein the addition amount of the organic solvent (A) and the organic solvent (B) based on the weight of the polymer are 2 to 100 wt % and 5 to 150 wt %, respectively, and the weight ratio of the organic solvent (A) to the weight of the organic solvent (B) is 0.1 to 8.0.

2. The process according to claim 1 which comprises heating the coagula containing the polymer particles, obtained by the addition of the coagulant, at a temperature equal to or higher than the boiling point or azeotropic point of the organic solvents to bind the particles and at the same time distil out the solvents.

3. The process according to claim 1 wherein the addition amounts of the organic solvent (A) and the organic solvent (B) based on the weight of the polymer are 5 to 50 wt. % and 10 to 80 wt. % respectively, and the weight ratio of the organic solvent (A) to the weight of the organic solvent (B) is 0.25 to 5.0.

4. The process of claim 1 wherein the brominated styrene polymer is selected from the group consisting of poly(tribromostyrene), poly(dibromostyrene), and copoly(tribromostyrene/dibromostyrene).

5. The process of claim 4 wherein the organic solvent (A) is at least one member selected from the group consisting of petroleum ether, benzene, toluene, xylene, ethylbenzene, diethylbenzene, methylene chloride, chloroform, carbon tetrachloride, dichloroethane and chlorobenzene; and the organic solvent (B) is at least one member selected from the group consisting of hexane, heptane, octane, cyclopentane, cyclohexane, methylcyclohexane, diisobutyl ketone, methyl n-propyl ketone, n-propyl acetate and n-butyl acetate.

* * * * *